US007269098B2

United States Patent
Nishida

(10) Patent No.: US 7,269,098 B2
(45) Date of Patent: Sep. 11, 2007

(54) ULTRASONIC TRANSMITTER, ULTRASONIC TRANSCEIVER AND SOUNDING APPARATUS

(75) Inventor: Masaru Nishida, Nishinomiya (JP)

(73) Assignee: Furuno Electric Company, Limited., Nishinomiya-shi, Hyogo-ken (JP)

( * ) Notice: Subject to any disclaimer, the term of this patent is extended or adjusted under 35 U.S.C. 154(b) by 381 days.

(21) Appl. No.: 10/857,976

(22) Filed: Jun. 2, 2004

(65) Prior Publication Data
US 2005/0007879 A1   Jan. 13, 2005

(30) Foreign Application Priority Data
Jun. 3, 2003 (JP) .............................. 2003-158239

(51) Int. Cl.
*H04B 1/02* (2006.01)
(52) U.S. Cl. ..................................... 367/137
(58) Field of Classification Search ................ 367/137, 367/138
See application file for complete search history.

(56) References Cited

U.S. PATENT DOCUMENTS

| 4,864,547 | A | * | 9/1989 | Krsna ........................ 367/137 |
| 5,715,155 | A | * | 2/1998 | Shahani et al. ............. 363/132 |
| 6,215,733 | B1 | * | 4/2001 | Rynne et al. ............... 367/137 |
| 6,229,402 | B1 | * | 5/2001 | Kataoka et al. .............. 331/34 |
| 6,570,818 | B1 | * | 5/2003 | Kirjavainen ................ 367/137 |
| 2004/0047477 | A1 | * | 3/2004 | Bank et al. ................. 381/120 |

FOREIGN PATENT DOCUMENTS

| GB | 0411076.3 | 3/2006 |
| JP | 2003-202370 A | 7/2003 |

OTHER PUBLICATIONS

Hua, C., "High Switching Frequency DSP Controlled PWM Inverter", Control Applications, 1993 Second IEEE Conference on., Sep. 13, 1993, pp. 273-281, vol. 1, Digital Object Identifier 10.1109/CCA. 1993.348276.*

* cited by examiner

*Primary Examiner*—Ian J. Lobo
(74) *Attorney, Agent, or Firm*—Birch, Stewart, Kolasch & Birch, LLP

(57) ABSTRACT

A driver circuit for generating a driving signal by pulse-width modulation (PWM) includes a half-bridge circuit formed essentially of a pair of series-connected FETs. When the level of an ultrasonic signal, or of the driving signal, is to be maximized, the individual FETs are switched at a switching frequency matched to the frequency of the driving signal. When the level of the ultrasonic signal, or the driving signal is to be reduced, on the other hand, the individual FETs are switched with specific timing determined based on the frequency of a clock signal of which period is shorter than that of the driving signal.

15 Claims, 13 Drawing Sheets

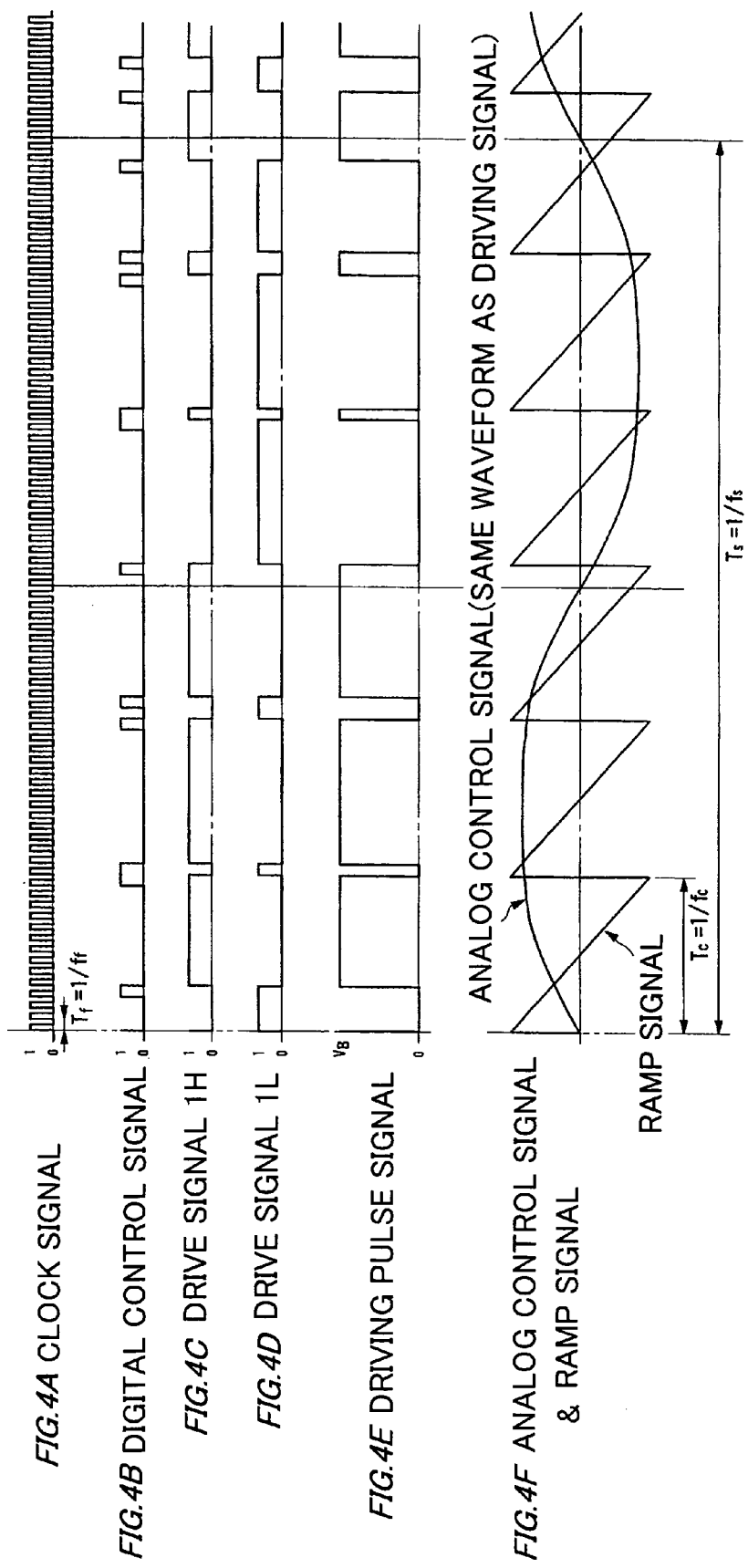

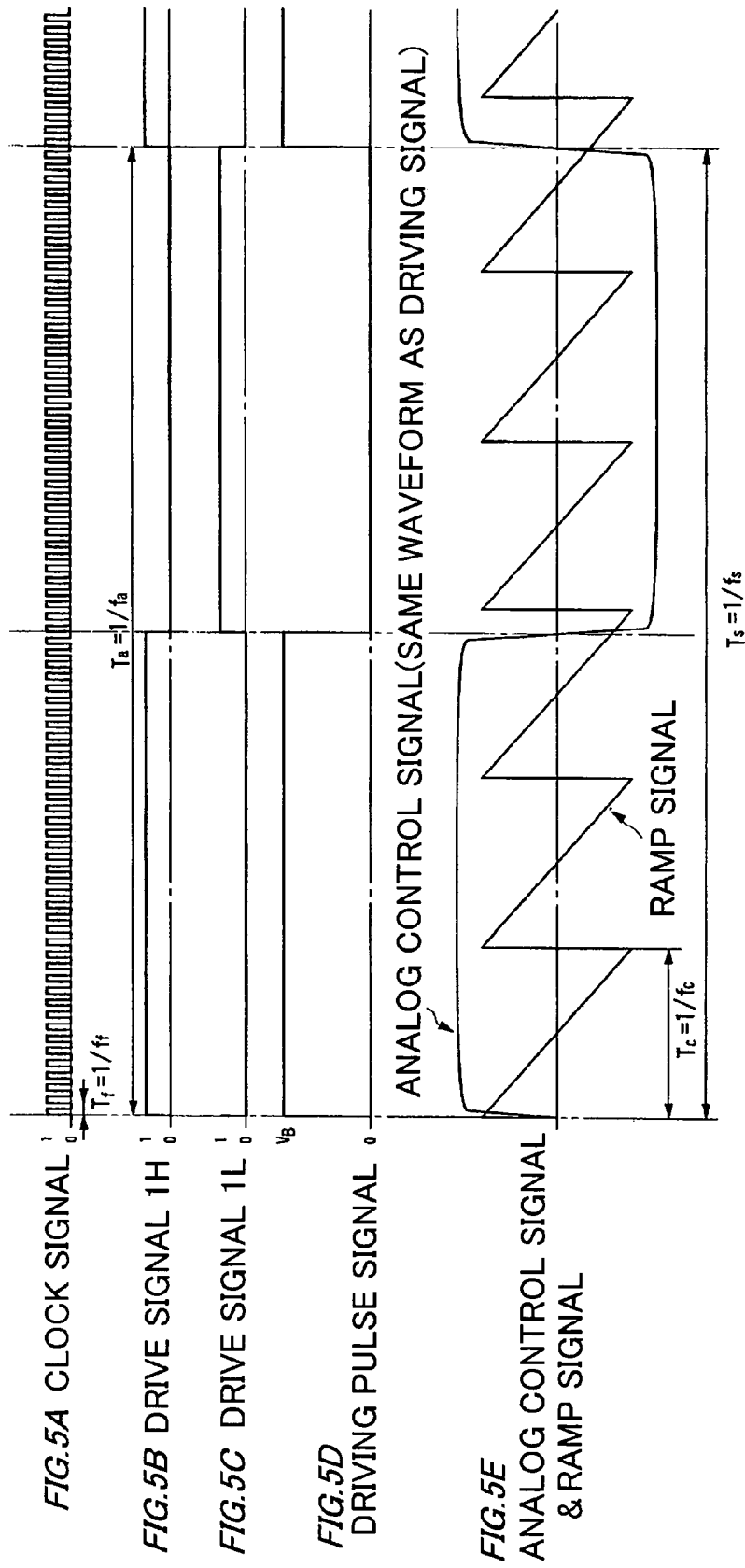

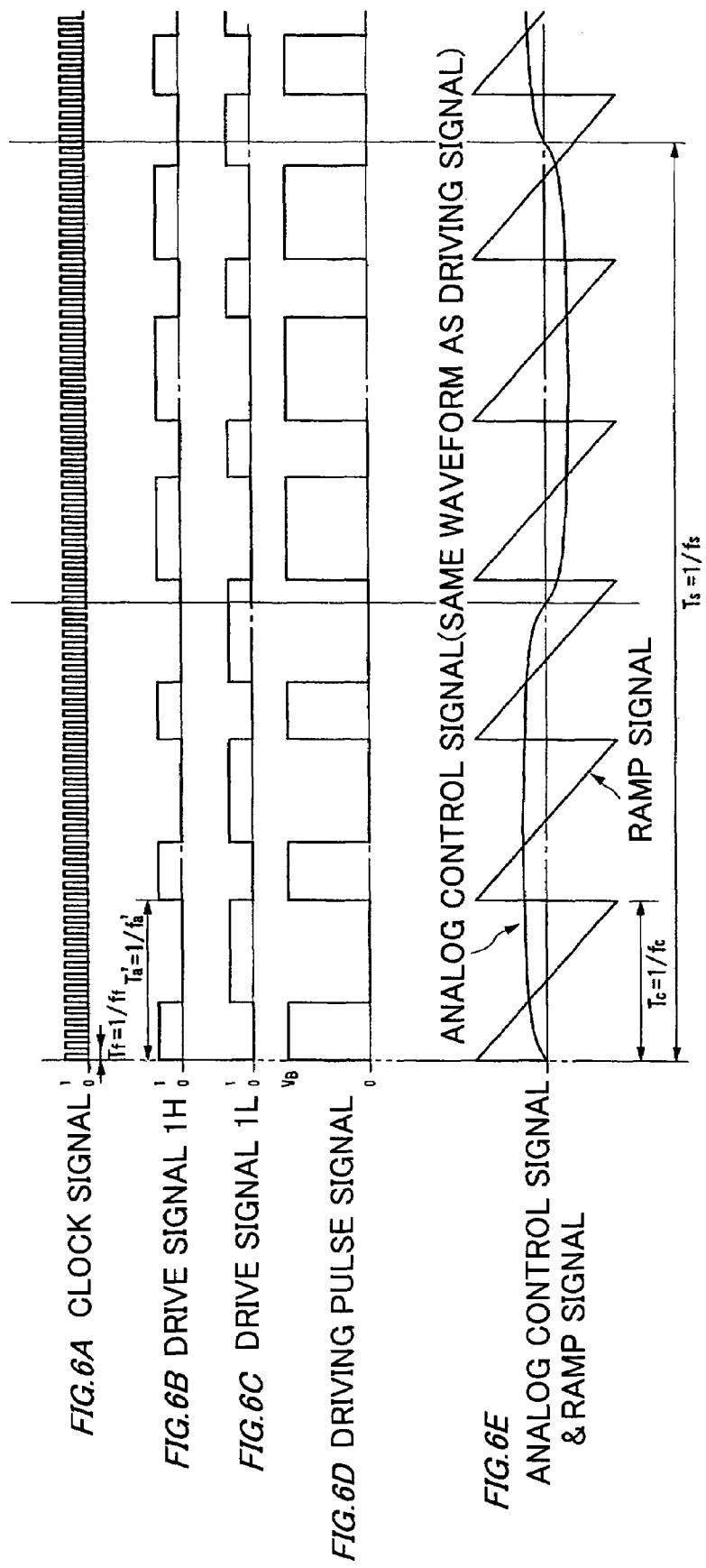

ULTRASONIC TRANSMITTER, ULTRASONIC TRANSCEIVER AND SOUNDING APPARATUS

This Non-Provisional application claims priority under 35 U.S.C. §119(a) on Patent Application No(s). 2003-158239 filed in JAPAN on Jun. 3, 2003, the entire contents of which are hereby incorporated by reference.

BACKGROUND OF THE INVENTION

1. Field of the Invention

The present invention relates to an ultrasonic transmitter for radiating ultrasonic waves, an ultrasonic transceiver for radiating ultrasonic waves and receiving echoes of the radiated ultrasonic waves, and a sounding apparatus including an ultrasonic transceiver for detecting objects using ultrasonic waves.

2. Description of the Related Art

Today, ultrasonic sounding apparatuses, such as scanning sonars, are widely used for detecting underwater objects (targets). A scanning sonar for detecting underwater objects in all surrounding directions has a generally cylindrical transducer. The scanning sonar forms an ultrasonic transmitting beam oriented in all directions around the transducer by activating vibrating elements arranged on a cylindrical surface of the transducer. Also, the scanning sonar forms a receiving beam oriented in a particular horizontal direction using a specific number of vertically arranged sets, or columns, of vibrating elements centered on that horizontal direction. Typically, this receiving beam is rotated around the transducer to detect underwater objects in a full-circle area by successively switching the columns of vibrating elements.

An ultrasonic transceiver of the aforementioned type of scanning sonar usually includes full-bridge circuits, each including four switching devices, for driving individual vibrating elements. Such an ultrasonic transceiver employs a pulse-duration modulation (PDM) control method which uses a signal having the same frequency as frequency fs (transmitting frequency) fs of an ultrasonic signal as drive signals for driving the switching devices.

FIG. 8 is an equivalent circuit of a full-bridge circuit used in an ultrasonic transceiver, and FIGS. 9A-9C are diagrams showing a driving pulse signal generated by the full-bridge circuit of FIG. 8 and drive signals supplied to individual switching devices Q1-Q4 of the full-bridge circuit.

Referring to FIGS. 8, 9A-9C, designated by $G_{Q1}$-$G_{Q4}$ are gates of the switching devices Q1-Q4, respectively, designated by XD is a vibrating element, designated by C1 and C2 are capacitors for isolating direct-current (dc) components, designated by $V_B$ is a driving voltage, and designated by $V_{XD}$ is a load voltage across the vibrating element XD.

As shown in FIG. 8, the full-bridge circuit includes a circuit in which a source of the switching device Q1 is connected to the driving voltage $V_B$, a drain of the switching device Q1 is connected to a source of the switching device Q2, and a drain of the switching device Q2 is grounded and a circuit in which a source of the switching device Q3 is connected to the driving voltage $V_B$, a drain of the switching device Q3 is connected to a source of the switching device Q4, and a drain of the switching device Q4 is grounded. In this full-bridge circuit, the drain of the switching device Q1 is connected to one of terminals of the vibrating element XD via the dc-isolating capacitor C1 and the drain of the switching device Q3 is connected to the other terminal of the vibrating element XD via the dc-isolating capacitor C2.

The drive signals having a frequency fs as shown in FIG. 9B are supplied to the switching devices Q1, Q4 and the drive signals having the same frequency fs as shown in FIG. 9C are supplied to the switching devices Q2, Q3, whereby the aforementioned driving pulse signal having the load voltage $V_{XD}$ as shown in FIG. 9A is produced and fed into the vibrating element XD. The driving pulse signal causes the vibrating element XD to oscillate and radiate the ultrasonic signal into a surrounding environment. The amplitude of oscillation (vibration) of the vibrating element XD can be adjusted by varying an on-duty ratio which is the ratio of the sum of ON periods of the driving pulse signal, or the sum of periods when the load voltage $V_{XD}$ is equal to $V_B$ or $-V_B$ during a given time duration, to the sum of ON and OFF periods during the same time duration. An example of an ultrasonic transmitter employing the aforementioned type of full-bridge circuit is found in Japanese Patent Application No. 2002-343913, for instance.

An ultrasonic transmitter employing the aforementioned type of full-bridge circuit has a problem in that the number of components increases due to the need for four switching devices in each full-bridge circuit and circuit configuration becomes complicated, resulting in an eventual increase in product cost.

One approach to the resolution of the aforementioned problem is to employ a half-bridge circuit including a pair of switching devices Q1, Q2 as shown in FIG. 10 in an ultrasonic transceiver.

FIG. 10 is an equivalent circuit of the half-bridge circuit, and FIGS. 11A-11C are diagrams showing a driving pulse signal generated by the half-bridge circuit of FIG. 10 and drive signals supplied to the individual switching devices Q1, Q2 of the half-bridge circuit.

Referring to FIGS. 10, 11A-11C, designated by $G_{Q1}$, $G_{Q2}$ are gates of the switching devices Q1, Q2, respectively, designated by XD is a vibrating element, designated by C is a capacitor, designated by $V_B$ is a driving voltage, and designated by $V_{XD}$ is a load voltage across the vibrating element XD.

As shown in FIG. 10, the half-bridge circuit is a circuit in which a source of the switching device Q1 is connected to the driving voltage $V_B$, a drain of the switching device Q1 is connected to a source of the switching device Q2, a drain of the switching device Q2 is grounded, and the drain of the switching device Q1 is connected to one of terminals of the vibrating element XD via the capacitor C.

The drive signals as shown in FIGS. 11A and 11B are supplied to the switching devices Q1 and Q2, respectively, whereby the aforementioned driving pulse signal having the load voltage $V_{XD}$ as shown in FIG. 11A is produced by the PDM control method and fed into the vibrating element XD. The driving pulse signal causes the vibrating element XD to oscillate and radiate the ultrasonic signal to the exterior. The amplitude of oscillation (vibration) of the vibrating element XD is regulated by varying the on-duty ratio as in the full-bridge circuit.

In the aforementioned circuit configuration in which the vibrating element XD is driven by the half-bridge circuit using the PDM control method, however, there occur harmonics as shown in FIGS. 12A-12C, 13A-13C.

FIG. 12A shows the waveform of a driving pulse signal obtained when an ultrasonic signal is produced at maximum output power by using the half-bridge circuit, FIG. 12B is a frequency spectrum of the driving pulse signal observed at the same time, and FIG. 12C is a frequency spectrum of the ultrasonic signal.

FIG. 13A shows the waveform of a driving pulse signal obtained when an ultrasonic signal is produced at output power reduced to a specific level (−20 dB) by using the half-bridge circuit, FIG. 13B is a frequency spectrum of the driving pulse signal observed at the same time, and FIG. 13C is a frequency spectrum of the ultrasonic signal. Shown in FIGS. 12A-12C, 13A-13C are examples in which the frequency fs of the ultrasonic signal is 81 kHz.

When the vibrating element XD is driven at the maximum output power using the half-bridge circuit, there occur harmonics of which frequencies are odd multiples of the frequency fs (i.e., multiples of the transmitting frequency fs by 3, 5, etc.) as shown in FIGS. 12A-12C. The odd-numbered harmonics, which also occur when the full-bridge circuit is used, can be suppressed by inserting a low-pass filter in an output stage connected to the vibrating element XD.

In a case where the output power is reduced by using the half-bridge circuit, there occur harmonics having all integral multiples of the transmitting frequency fs (i.e., multiples of the frequency fs by 2, 3, 4, etc.) as shown in FIGS. 13A-13C. While almost all of these harmonic components can be suppressed by using a low-pass filter, the second harmonic component can only be removed by use of an additional filter having a high Q factor, rendering circuit design extremely difficult. This is because the second harmonic has a frequency component very close to the transmitting frequency fs of the ultrasonic signal. (In the example of FIG. 12C, the frequency fs of the ultrasonic signal is 81 kHz so that the frequency 2 fs of the second harmonic is 162 kHz.) In addition, the levels of the harmonics vary so little compared to the level of the ultrasonic signal that it is necessary to use a filter having a remarkably large attenuation factor. It is extremely difficult to configure a system which satisfies all these requirements. Even if it is at all possible to design such a system, a series of complicated adjustments would be necessary in manufacturing the system, causing an increase in work load.

One approach to the solution of the above problem would be to employ a pulse-width modulation (PWM) control method in the half-bridge circuit instead of the PDM control method. The term "pulse-width modulation", or "PWM", as used in this Specification is a form of pulse-duration modulation, in which the vibrating element XD is driven by a driving pulse signal having a higher frequency fa than the transmitting frequency fs of the ultrasonic signal so that there is output a signal containing multiple pulses having a period Ta within a period Ts of the transmitted ultrasonic signal to pulse-duration-modulate a signal based on the sum of durations of these multiple pulses within the period Ts. When such a driving pulse signal for PDM control operation is supplied to the vibrating element XD, the vibrating element XD resonates at the transmitting frequency fs, and not at the frequency fa of the driving pulse signal, thereby emitting the ultrasonic signal at the transmitting frequency fs. The pulselength of these pulses is determined by comparing a sawtooth-shaped ramp signal having a frequency fc (=fa) higher than the frequency fs of the ultrasonic signal with an analog control signal having the same waveform as the ultrasonic signal, wherein the sawtooth-shaped ramp signal and the analog control signal are synchronized with each other.

When the PDM control method is used with the half-bridge circuit, there occur multiple pulses within the period Ts of the ultrasonic signal even when the output power is reduced. Thus, extremely narrow pulses are not generated within the period Ts so that the half-bridge circuit does not produce such spurious emissions (e.g., the second harmonic) that are difficult to remove.

However, because the frequency fc of the ramp signal and the frequency fa of the driving pulse signal determined by the ramp signal are higher than the frequency fs of the ultrasonic signal, output efficiency decreases as a result of an increase in power loss due to heat generation by the switching devices Q1, Q2 when the half-bridge circuit is operated at the maximum output power.

SUMMARY OF THE INVENTION

It is an object of the invention to provide an ultrasonic transmitter which can transmit ultrasonic waves at high efficiency and easily suppress harmonic emissions with a small number of components. It is a further object of the invention to provide an ultrasonic transceiver employing such an ultrasonic transmitter as well as a sounding apparatus employing such an ultrasonic transceiver.

According to the invention, an ultrasonic transmitter includes a transducer on which a plurality of vibrating elements are arranged, and a transmitting beamformer for forming an ultrasonic transmitting beam by activating the vibrating elements by feeding driving pulse signals thereinto so that the individual vibrating elements output ultrasonic signals at a specific transmitting frequency fs and at varying amplitudes, the transmitting beamformer including half-bridge circuits each of which includes a pair of series-connected switching devices, such as field effect transistors (FETs), and generates the driving pulse signal by alternately switching the two switching devices at a specific switching frequency fa. In this ultrasonic transmitter, each of the half-bridge circuits generates the driving pulse signal by matching the switching frequency fa to the transmitting frequency fs and matching the sum of ON periods of the switching devices to the sum of OFF periods of the switching devices within each switching cycle of the switching devices when the ultrasonic signals are transmitted at maximum output power. On the other hand, each of the half-bridge circuits generates the driving pulse signal based on multiple patterns of ON periods and OFF periods of the switching devices contained in each switching cycle of the switching devices by making the switching frequency fa higher than the transmitting frequency fs and controlling an ON/OFF pattern determined by a combination of the ON periods and the OFF periods of the switching devices when the ultrasonic signals are transmitted at reduced output power.

In this construction, the switching frequency fa is matched to the transmitting frequency fs when the ultrasonic signals are transmitted at maximum output power so that power loss due to switching operation of the switching devices is suppressed. When the output power of the ultrasonic signals is reduced, on the other hand, the switching frequency fa is made higher than the transmitting frequency fs so that the switching frequency fa is separated far away from the transmitting frequency fs. Harmonic components are dependent on the switching frequency fa. Consequently, it is possible to suppress the occurrence of unremovable harmonics having frequencies close to the transmitting frequency fs. In addition, it is possible to relatively reduce power loss due to switching operation even when the switching devices are switched at a high frequency, because the output power of the ultrasonic signals is reduced in this case.

In one aspect of the invention, the switching frequency fa is controlled based on a reference signal of which frequency $f_r$ is higher than the switching frequency fa regardless of the output power of the ultrasonic signals.

The ultrasonic transmitter thus constructed employing the half-bridge circuits makes it possible to generate the driving pulse signal with a small number of components. Also, this construction makes it possible to easily vary the switching frequency fa and the ON periods of the switching devices according to desired amplitudes of the ultrasonic signals using the reference signal of which frequency $f_r$ is higher than the switching frequency fa. As a consequence, a low-pass filter for suppressing harmonics can be easily configured since the occurrence of such spurious emissions (e.g., the second harmonic) that are difficult to remove is avoided by making the switching frequency fa higher than the transmitting frequency fs when the output power of the ultrasonic signals is reduced. When the output power of the ultrasonic signals is at a maximum, on the other hand, the switching frequency fa is lowered down to the transmitting frequency fs. Even when the switching frequency fa is lowered to the transmitting frequency fs at the maximum output power, the driving signal is not made of extremely narrow pulses having a period Ts so that the occurrence of harmonics is suppressed. Additionally, since the switching frequency fa of the switching devices lowers in this case, it is possible to prevent power loss due to heat generation caused by the switching operation.

In the context of this Specification, the expression "reduced output power" refers to any levels of output power lower than the maximum output power, including situations where the output power from the vibrating elements are decreased by only a small amount or by a specific amount below the maximum level. The aforementioned construction of the invention works effectively particularly when the output power is reduced by the specific amount or more.

According to the invention, an ultrasonic transceiver includes the aforementioned ultrasonic transmitter and a receiving beamformer for producing an ultrasonic receiving beam by controlling signals produced from ultrasonic waves received by the multiple vibrating elements of the transducer.

The ultrasonic transceiver thus constructed transmits the ultrasonic transmitting beam formed in the aforementioned manner from the multiple vibrating elements of the transducer during each successive transmit cycle and receives returning echo signals through the vibrating elements during each successive receive cycle. The ultrasonic transceiver forms the receiving beam which is successively oriented (steered) in desired directions by using phased array technique.

According to the invention, a sounding apparatus includes the aforementioned ultrasonic transceiver and a device for controlling the receiving beamformer of the ultrasonic transceiver to scan successive sounding directions within the transmitting beam and pick up echo signals from the individual sounding directions and for displaying detected echo data obtained from the echo signals.

Overall, the present invention makes it possible to configure a compact and low-cost ultrasonic transmitter capable of generating driving signals of which amplitudes are controlled by pulse-width modulation (PWM), the ultrasonic transmitter including in a transmitting beamformer thereof half-bridge circuits. In this ultrasonic transmitter, switching devices of each half-bridge circuit are switched at the frequency of the driving signal based on a specific reference signal when the level of the driving signal is maximized, whereas the switching devices of each half-bridge circuit are switched at a switching frequency which is higher than the frequency of the driving signal using the frequency of a clock signal which is higher than the frequency of the driving signal as a reference when the level of the driving signal is reduced, to generate the driving signals at high efficiency.

In addition, the invention provides a compact and low-cost sounding apparatus which can successively scan desired sounding directions, obtain received echo data derived from a particular search area based on echo signals received from the individual sounding directions, and display the received echo data to enable an operator to accurately recognize a detected echo image for multiple sounding directions substantially at the same point in time. Such a sounding apparatus can be configured by employing the aforementioned ultrasonic transceiver including the transmitting beamformer and the receiving beamformer.

These and other objects, features and advantages of the invention will become more apparent upon reading the following detailed description along with the accompanying drawings.

BRIEF DESCRIPTION OF THE DRAWINGS

FIGS. 4A, 4B, 4C, 4D, 4E and 4F are a timing chart showing a relationship among a clock signal, an analog control signal (driving signal), a digital control signal, a ramp signal, drive signals and a driving pulse signal;

FIGS. 5A, 5B, 5C, 5D and 5E are a timing chart showing a relationship among the clock signal, the drive signals, the driving pulse signal, the analog control signal and the ramp signal when the amplitude of the analog control signal is at a maximum;

FIGS. 6A, 6B, 6C, 6D and 6E are a timing chart showing a relationship among the clock signal, the drive signals, the driving pulse signal, the analog control signal and the ramp signal when the amplitude of the analog control signal (driving signal) is decreased;

DETAILED DESCRIPTION OF THE PREFERRED EMBODIMENTS OF THE INVENTION

A scanning sonar including an ultrasonic transceiver according to a preferred embodiment of the invention is now described referring to the appended drawings.

Figure 1:
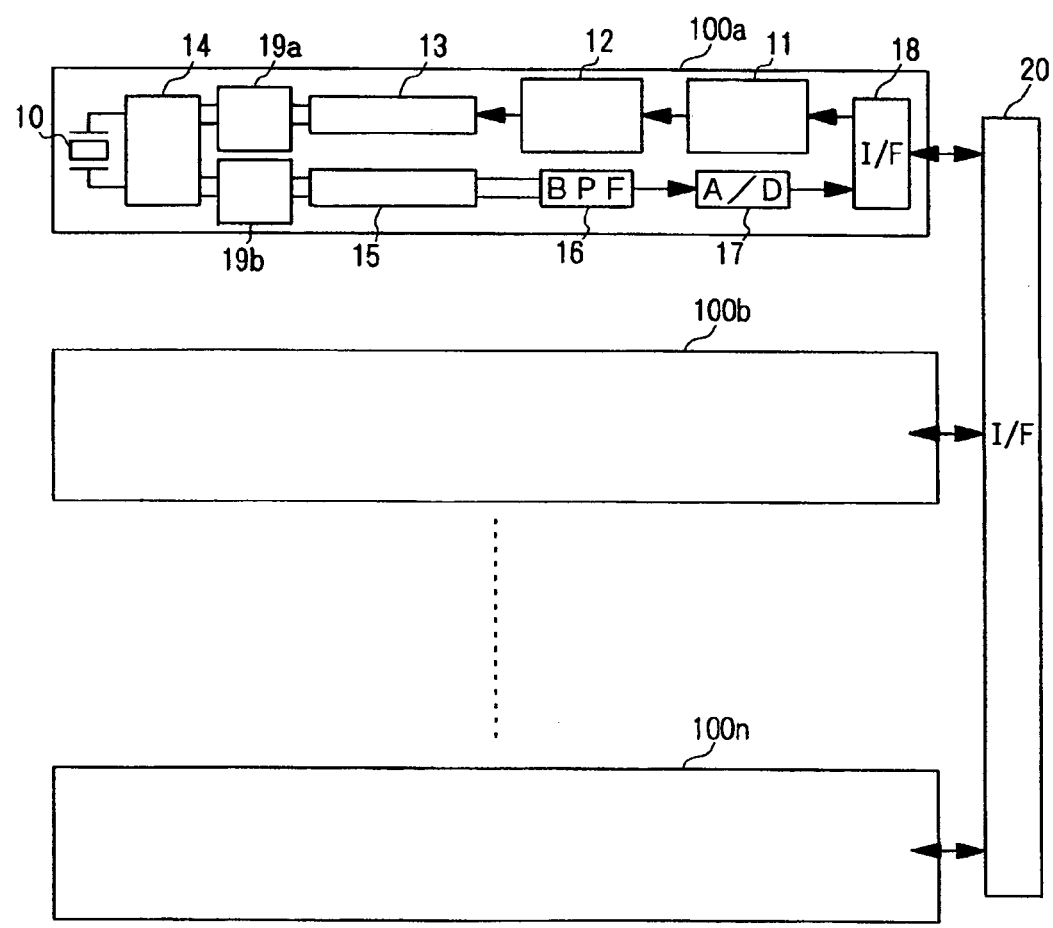
FIG. 1 is a block diagram generally showing the configuration of transmit-receive channels of a scanning sonar according to a preferred embodiment of the invention.

FIG. 1 is a block diagram generally showing the configuration of transmit-receive channels 100 of the scanning sonar according to the embodiment. Referring to FIG. 1, each of the transmit-receive channels 100 includes a driver interface 11 which generates drive signals for controlling a driver circuit 12 based on a clock signal (which corresponds to a reference signal referred to in claim 2 of this invention) and a digital-formatted control signal for controlling switching operation supplied from a later-described programmable transmitting beamformer 26. The aforementioned drive signals are for performing pulse-width modulation (PWM) and these drive signals are produced through a digital process. When an analog process is used in performing pulse-width modulation, the drive signals are produced based on a comparison between a sawtooth-shaped ramp signal and an analog control signal corresponding to a desired ultrasonic signal as explained in the foregoing related art statement. Since the digital process is used in the present embodiment, however, the drive signals are produced by using the digital control signal. Accordingly, a later-described waveform memory 24 stores multiple patterns of digital control signals corresponding to ramp signals and analog control signals which would be used in the analog process, and the drive signals are produced based on these digital control signals. The digital control signals corresponding to individual amplitude values are obtained by setting the amplitude of the ramp signal to a fixed value and varying the ratio of the amplitude of the analog control signal, or driving signal, to the amplitude of the ramp signal.

Figure 2:
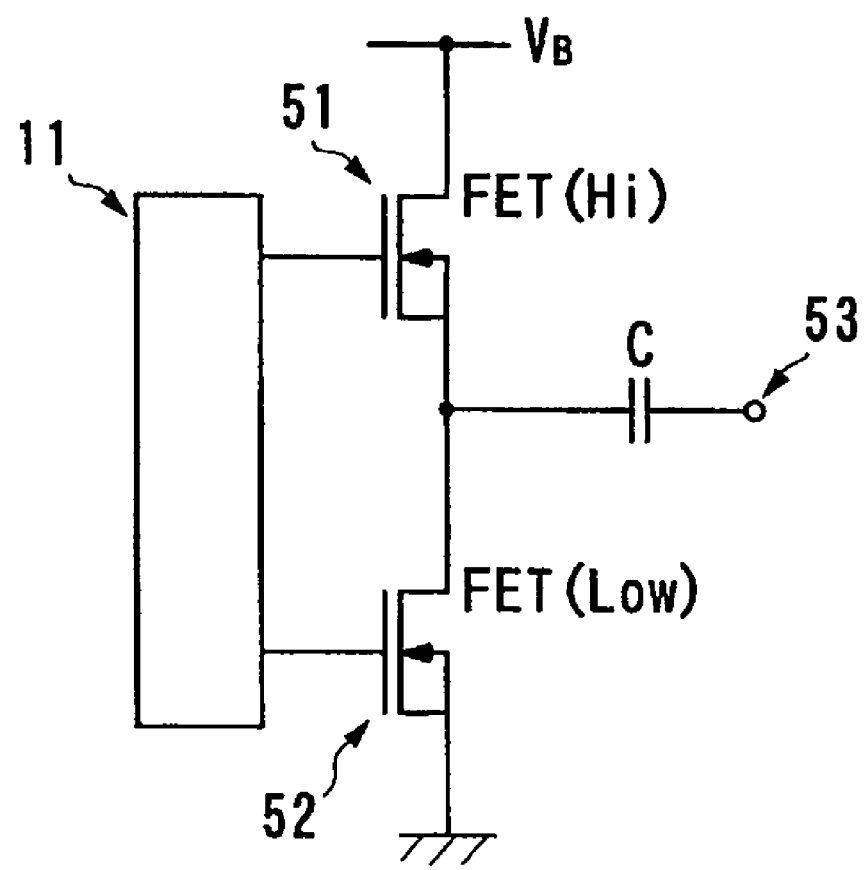
FIG. 2 is a general circuit diagram of a half-bridge circuit included in a driver circuit of each transmit-receive channel of FIG. 1.

FIG. 2 is a general circuit diagram of a half-bridge circuit included in the driver circuit 12 of each transmit-receive channel 100 of FIG. 1.

The half-bridge circuit includes a pair of FETs 51, 52 serving as switching devices and a capacitor C. The driver interface 11 supplies drive signals to the FETs 51, 52 through gates thereof. As depicted in FIG. 2, a drain of the FET 51 is connected to a source of the FET 52 and to an output terminal 53 of the half-bridge circuit via the capacitor C. A driving voltage $V_B$ determining the voltage of a driving pulse signal is supplied to a source of the FET 51 and a drain of the FET 52 is grounded. The drive signals fed into the half-bridge circuit thus configured cause the FETs 51, 52 to alternately switch and output the driving pulse signal having a specific waveform pattern. The driver circuit 12 converts the driving pulse signal into a sine-wave driving signal of which level has been shifted by a particular amount by an unillustrated converter circuit and outputs this sine-wave driving signal.

A transmitting amplifier circuit 13 amplifies this driving signal and drives a vibrating element 10 through a transmit-side matching circuit 19a and a transmit-receive switching circuit 14. The vibrating element 10 which is caused to oscillate by the input driving signal in the aforementioned manner radiates an ultrasonic signal having the same frequency as the driving signal into a surrounding environment (e.g., the body of water). The transmit-receive switching circuit 14 passes an output signal of the transmitting amplifier circuit 13 fed through the transmit-side matching circuit 19a to the vibrating element 10 during each successive transmit cycle and passes an echo signal received by the vibrating element 10 to a preamplifier 15 through a receive-side matching circuit 19b during each successive receive cycle. The preamplifier 15 amplifies the received echo signal and a bandpass filter 16 in a succeeding stage removes noise components existing in the received echo signal but outside the passband of the bandpass filter 16. An analog-to-digital (A/D) converter 17 samples the echo signal filtered by the bandpass filter 16 at specific sampling intervals and converts the sampled signals into a train of digital echo data.

The scanning sonar is provided with a plurality of such transmit-receive channels designated 100a, 100b, ......, 100n as many as the number of the vibrating elements 10 which are arranged on a surface of a transducer having a cylindrical or spherical shape, for instance.

Figure 3:
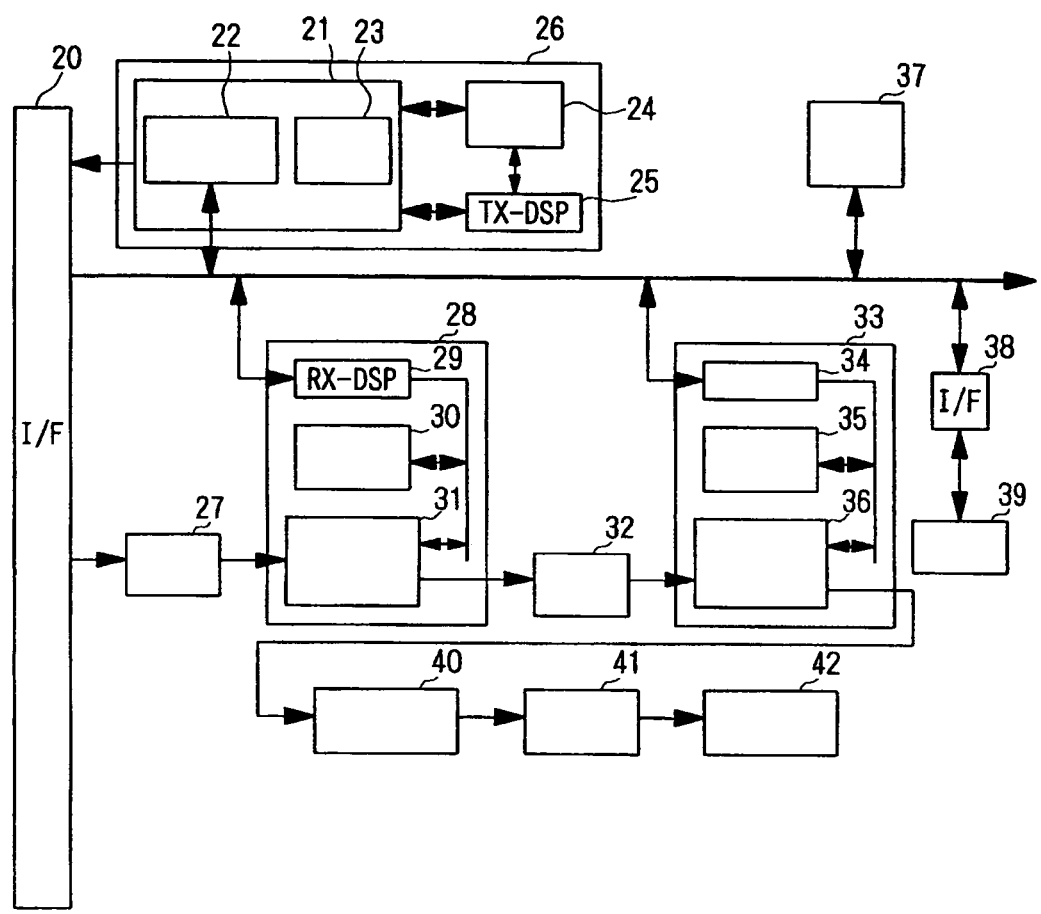
FIG. 3 is a block diagram of a control section for forming a transmitting beam and a receiving beam by using the multiple transmit-receive channels shown in FIG. 1 and for generating a detected echo image derived from a particular search area.

FIG. 3 is a block diagram of a control section for forming a transmitting beam and a receiving beam using the multiple transmit-receive channels 100 shown in FIG. 1 and generating a detected echo image derived from a particular search area. An interface 20 shown in FIG. 3 is identical to that shown in FIG. 1.

The following discussion deals with the configuration of a transmitting system of the scanning sonar.

Referring to FIG. 3, the programmable transmitting beamformer 26 includes a driving signal generating circuit 21, the aforementioned waveform memory 24 and a transmit digital signal processor (DSP) 25. Formed of a field-programmable gate array (FPGA), the driving signal generating circuit 21 incorporates a timing generator 22 and a coefficient table 23. The timing generator 22 generates a signal which gives timing of generating driving signals. The coefficient table 23 stores coefficients necessary for the transmit DSP 25 to perform calculations. As stated earlier, the waveform memory 24 stores multiple patterns of digital control signals made up of binary values "0" and "1". The transmit DSP 25 reads out one of the digital control signals from the waveform memory 24 and generates a control signal defining the amounts of time delays to be introduced into the transmit-receive channels 100 of the individual vibrating elements 10. Also, the transmit DSP 25 calculates and updates data content of the coefficient table 23 during each successive transmit cycle.

The driving signal generating circuit 21 outputs the digital control signal generated by the transmit DSP 25 with the timing given by the timing generator 22 together with the clock signal through the interface 20.

A combination of the programmable transmitting beamformer 26 and the multiple vibrating elements 10 together constitute a transmitting beamformer.

Referring again to FIG. 3, a buffer memory 27 is a memory for temporarily storing received echo data fed from the individual channels 100 through the interface 20. Designated by the numeral 28 is a programmable receiving beamformer which includes a receive DSP 29, a coefficient table 30 and a receiving beamforming processor 31. The receive DSP 29 calculates phases of echo signals received by the individual vibrating elements 10 as well as weights to be assigned to the vibrating elements 10 for each direction of the receiving beam and writes these parameters in the coefficient table 30. The receiving beamforming processor 31 synthesizes the echo signals received by the individual vibrating elements 10 by applying the phases and weights written in the coefficient table 30 to obtain a synthesized received echo signal. The receiving beamforming processor 31 generates this synthesized received echo signal as time series data for each direction of the receiving beam and writes this data in a buffer memory 32. The receiving beamforming processor 31 is formed of an FPGA.

Designated by the numeral 33 is a programmable filter which includes a filtering DSP 34, a coefficient table 35 and a filtering processor 36. The filtering processor 36 is formed of an FPGA. The filtering DSP 34 calculates a filter coefficient for obtaining specific bandpass filter characteristics for each direction of the receiving beam and writes the filter coefficients so obtained in the coefficient table 35. The filtering processor 36 performs mathematical operation as a finite impulse response (FIR) filter based on the filter coefficients stored in the coefficient table 35 and produces passband-corrected echo signals.

An envelope detector 40 detects an envelope of the passband-corrected echo signal derived from each direction of the receiving beam. Specifically, the envelope detector 40 detects the envelope by calculating the square root of the sum of the square of a real component of a time waveform and the square of an imaginary component of the time waveform.

An image processor 41 converts received echo signal intensities at individual distances in each direction of the receiving beam into image information and outputs this image information to a display 42. As a consequence, the display 42 presents a detected echo image of a specific search area on-screen.

An operating panel 39 is an input terminal for entering commands for setting the search area and other parameters as appropriate. A host central processing unit (CPU) 37 reads the commands entered through the operating panel 39 via an interface 38 and controls individual circuit elements described above accordingly.

Described next is how the driving signal is generated.

In this embodiment, the half-bridge circuit shown in FIG. 2 is used in the driver circuit 12, in which the driving signal is generated by the aforementioned PWM control method. Although the driving signal is generated by the PWM control method, the driving signal thus generated is substantially a signal having the same waveform as a signal generated by the aforementioned PDM control method at maximum output power.

FIGS. 4A-4F are a timing chart showing a relationship among the clock signal, the analog control signal (driving signal), the digital control signal, the ramp signal, the drive signals and the driving pulse signal. Although the ramp signal and the analog control signal are not used in actuality as the PWM control method is digitally carried out in this embodiment, waveforms of these signals are illustrated for the convenience of explanation.

In the timing chart of FIGS. 4A-4F, the symbol Tf ($=1/f_f$) indicates the period of the clock signal, the symbol Tc ($=1/f_c$) indicates the period of the ramp signal, the symbol Ts ($=1/f_s$) indicates the period of the analog control signal, and the driving signal has the same waveform as the analog control signal.

As stated earlier, the waveform memory 24 stores multiple patterns of digital control signals (FIG. 4B) which are used for generating drive signals 1H (FIG. 4C) and 1L (FIG. 4D). The digital control signal, which is made up of binary values "0" and "1" and synchronized with the clock signal, determines whether to change or hold current levels (states) of the drive signals 1H, 1L. When the value of the digital control signal becomes "1", the levels of the drive signals 1H, 1L are switched. While the value of the control signal remains at "0", the drive signals 1H, 1L maintain their current levels. As already mentioned, the waveform memory 24 stores multiple patterns of digital control signals corresponding to different values of amplitude of the driving signal (analog control signal), or different values of output power. One of these digital control signal patterns corresponding to a specified value of output power (amplitude) is read out from the waveform memory 24.

The driver interface 11 generates drive signals 1H (FIG. 4C) and 1L (FIG. 4D) based on the aforementioned clock signal and digital control signal.

The driver circuit 12 includes the half-bridge circuit including a pair of field effect transistors (FETs) 51, 52 as stated earlier. The drive signal 1H is supplied to the FET 51 and the drive signal 1L is supplied to the FET 52.

Now, operation of the half-bridge circuit is explained.

When the drive signal 1H is in a High state and the drive signal 1L is in a Low state, the FET 51 turns to an ON state and the FET 52 turns to an OFF state. As a result, the driving voltage $V_B$ supplied to the source of the FET 51 is supplied to the output terminal 53 of the half-bridge circuit through the capacitor C and the amplitude of the driving signal becomes equal to $V_B$. When the drive signal 1H is in a Low state and the drive signal 1L is in a High state, on the contrary, the FET 51 turns to an OFF state and the FET 52 turns to an ON state. In this case, the driving voltage $V_B$ is not supplied to the output terminal 53 so that the amplitude of the driving signal becomes zero.

As the drive signals 1H, 1L are input into the driver circuit 12 as seen above, the half-bridge circuit outputs the driving pulse signal of which amplitude alternates between $V_B$ and 0.

The amplitude of the driving signal is determined by an on-duty ratio which is the ratio of the sum of time periods during which the amplitude of the driving pulse signal is $V_B$ within the period Ts of the driving signal to the period Ts. This means that the desired driving signal is obtained as the drive signal is pulse-width-modulated by the digital control signal.

When the pulse-width-modulated drive signal is applied to the vibrating element 10, the vibrating element 10 resonates at the frequency (transmitting frequency) fs of the driving signal, and not at the frequency fa of the driving pulse signal from which the driving signal is produced, so that the vibrating element 10 transmits an ultrasonic signal at the frequency fs.

The aforementioned digital control signal is produced as stated below.

Referring to FIG. 4F, pulse-width modulation (PWM) is performed as follows when an analog process is used. After the level of the ramp signal has sharply risen to a positive peak, the level of the ramp signal linearly falls as illustrated. The sawtooth-shaped ramp signal having the period Tc rises to the positive peak level upon reaching a negative peak level. This ramp signal and the analog control signal having the same waveform and period Ts as the driving signal are synchronized with each other, and the amplitudes of these two signals are compared. When the amplitude of the ramp signal is larger than the amplitude of the analog control signal, the digital control signal is set such that the drive signal 1H turns to the Low state (binary "0") and the drive signal 1L turns to the High state (binary "1"). When the amplitude of the ramp signal is smaller than the amplitude of the analog control signal, on the contrary, the digital control signal is set such that the drive signal 1H turns to the High state (binary "1") and the drive signal 1L turns to the Low state (binary "0"). The digital control signal is set in such a way that the levels of the drive signals 1H, 1L switch as stated above.

FIGS. 5A-5E are a timing chart showing a relationship among the clock signal, the drive signals 1H, 1L, the driving pulse signal, the analog control signal and the ramp signal when the amplitude of the analog control signal is at a maximum, and FIGS. 6A-6E are a timing chart showing a relationship among the clock signal, the drive signals 1H, 1L, the driving pulse signal, the analog control signal and the ramp signal when the amplitude of the analog control signal is lowered.

In FIGS. 5A-5E, 6A-6E, the symbol Tf ($=1/f_f$) indicates the period of the clock signal, the symbol Tc ($=1/f_c$) indicates the period of the ramp signal, the symbol Ts ($=1/f_s$) indicates the period of the analog control signal, and the symbol Ta ($=1/f_a$) indicates the period (switching period) at which the FETs 51, 52 of the half-bridge circuit are switched. For ease of understanding, the process of pulse-width modulation is explained with reference to the analog control signal and the ramp signal, rather than the digital control signal of which waveform is not shown in FIGS. 5A-5E, 6A-6E.

Figure 12A:
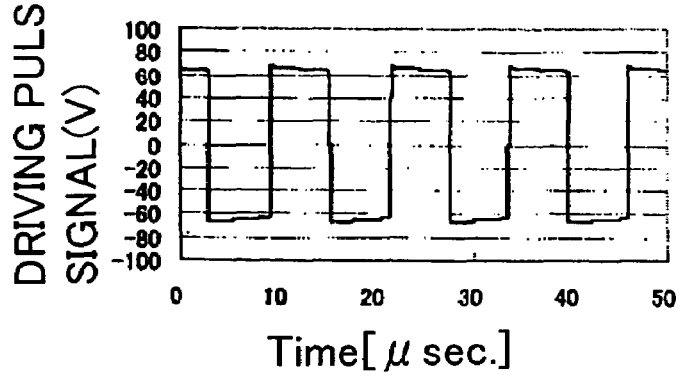
FIGS. 12A, 12B and 12C are diagrams showing the waveform of a driving pulse signal, a frequency spectrum of the driving pulse signal and a frequency spectrum of an ultrasonic signal observed when the ultrasonic signal is produced at maximum output power by using the half-bridge circuit, respectively.
Figure 12B:
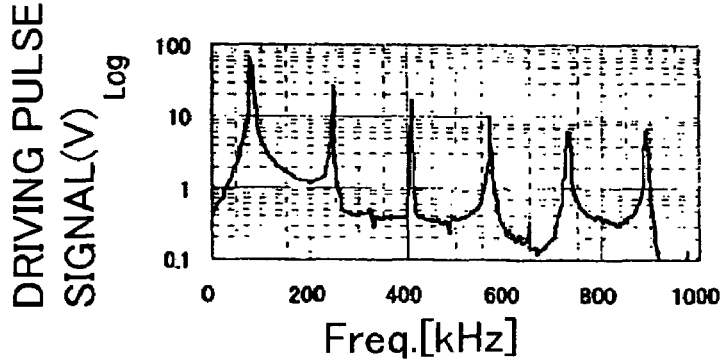
Figure 12C:
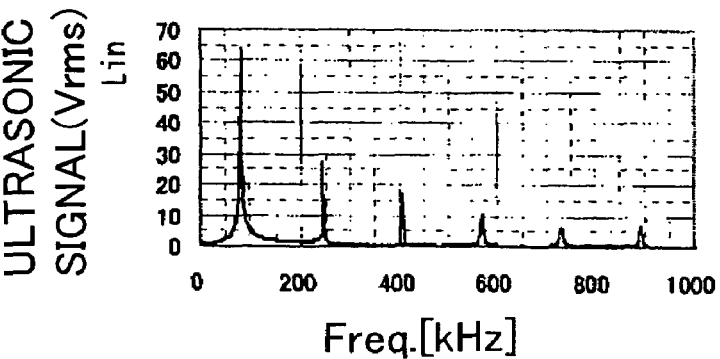

As can be seen from FIG. 5E, the amplitude of the analog control signal is always larger than that of the ramp signal. Therefore, the drive signal 1H is always in the High state (binary "1") and the drive signal 1L is always in the Low state (binary "0") during half the period of the analog control signal when the level thereof is positive. Contrary to this, the drive signal 1H is always in the Low state (binary "0") and the drive signal 1L is always in the High state (binary "1") during half the period of the analog control signal when the level thereof is negative. Consequently, the period Ta of the drive signals 1H, 1L matches the period Ts of the analog control signal. This means that the switching frequency fa of the half-bridge circuit matches the frequency fs of the driving signal having the same waveform as the analog control signal and of the ultrasonic signal produced from the driving signal. Accordingly, the driving pulse signal has a waveform as depicted in FIG. 5D, which coincides with the waveform of the driving pulse signal shown in FIG. 12A. The aforementioned PWM process is therefore substantially identical to a process performed by using the PDM control method.

Although an efficiency-related problem is apt to occur particularly at the maximum output power, the aforementioned structure of the embodiment makes it possible to output the driving signal at high efficiency at a lowered switching frequency fa of the switching devices (FETs 51, 52). In addition, since the driving pulse signal is not made of extremely narrow pulses having the period Ts, there occurs no problem related to spurious emissions at the maximum output power.

When the amplitude of the analog control signal is decreased as shown in FIG. 6E, on the other hand, the level of the analog control signal becomes alternately higher and lower than the level of the ramp signal at a period T'a which is shorter than the period Ts of the driving signal. Therefore, a switching frequency f'a becomes higher than the frequency fs of the driving signal, and levels (states) of the drive signals 1H, 1L change at multiples of the period Tf of the clock signal. As the drive signals 1H, 1L shown in FIGS. 6B and 6C are produced in this way, the driving pulse signal shown in FIG. 6D is obtained. Consequently, it is possible to generate a driving signal having a small amplitude, or a driving signal of which output power is decreased. The aforementioned modulation process is therefore is a process performed by using the PWD control method itself.

Figure 7A:
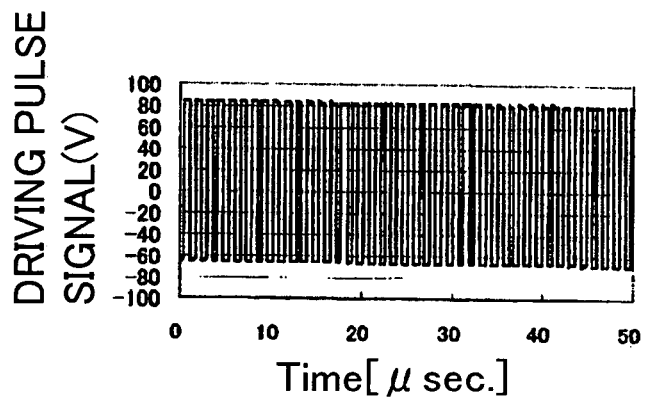
FIGS. 7A, 7B and 7C are diagrams showing the waveform of a driving pulse signal, a frequency spectrum of the driving pulse signal and a frequency spectrum of a driving signal obtained when the driving pulse signal is produced by using the clock signal as a reference and the amplitude of the driving signal is decreased, respectively.
Figure 7B:
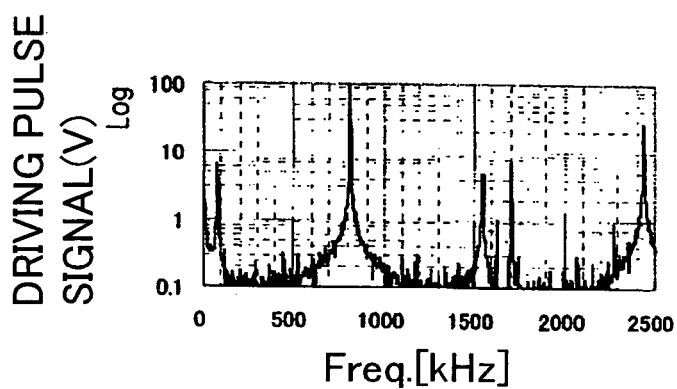
Figure 7C:
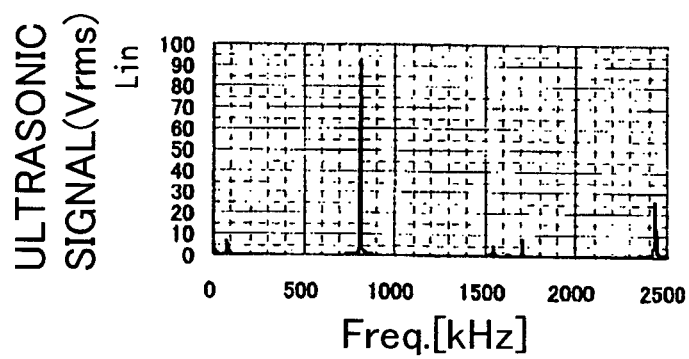
Figure 8:
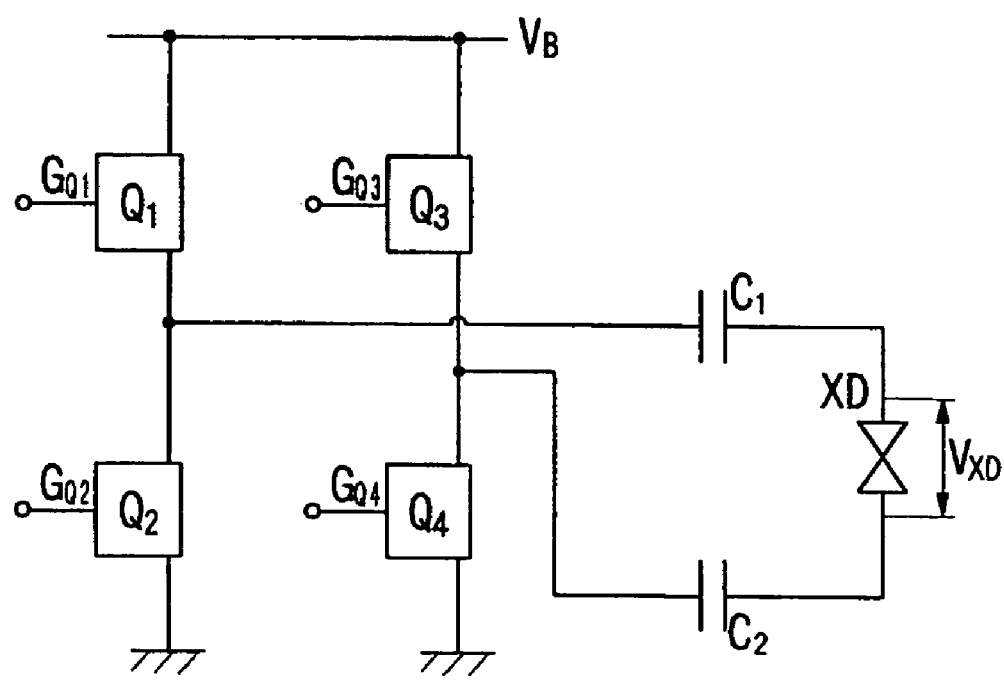
FIG. 8 is an equivalent circuit of a full-bridge circuit used in a conventional ultrasonic transceiver.
Figures 9A, 9B, 9C:
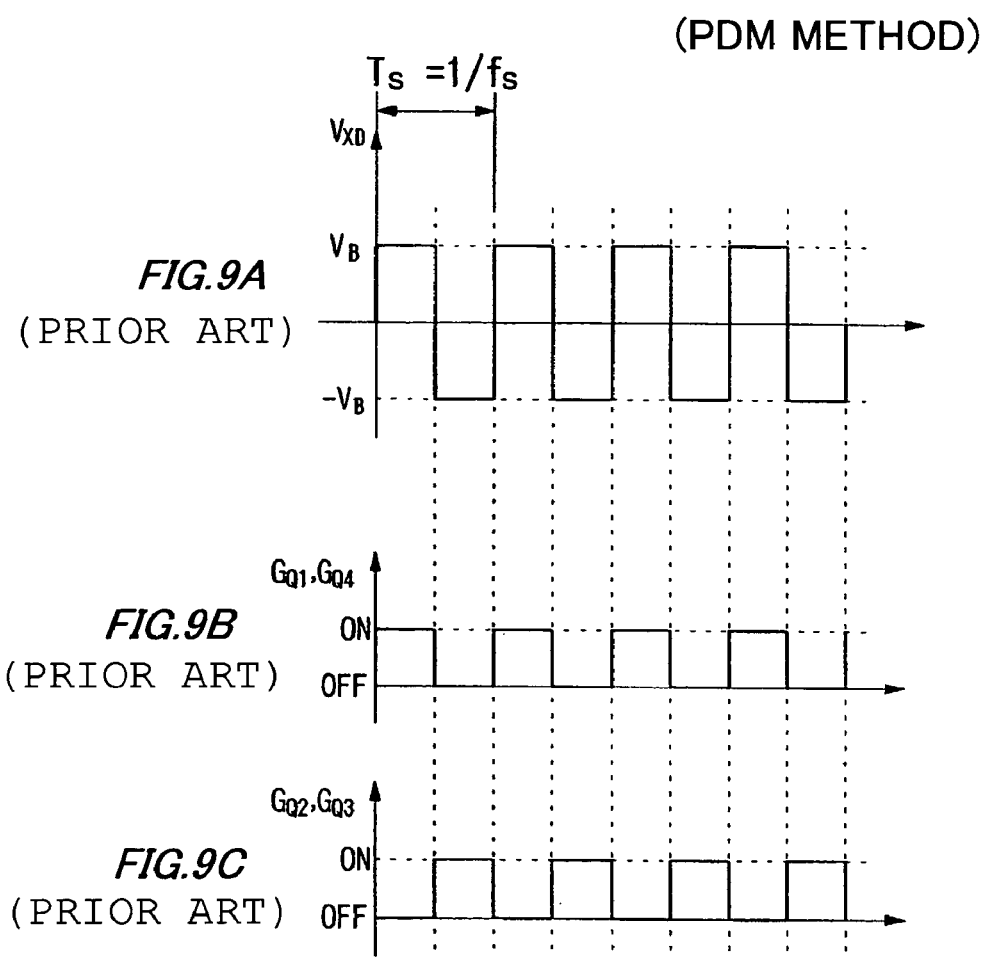
FIGS. 9A, 9B and 9C are diagrams showing a driving pulse signal generated by the full-bridge circuit of FIG. 8 and control signals (drive signals) supplied to individual switching devices of the full-bridge circuit.
Figure 10:
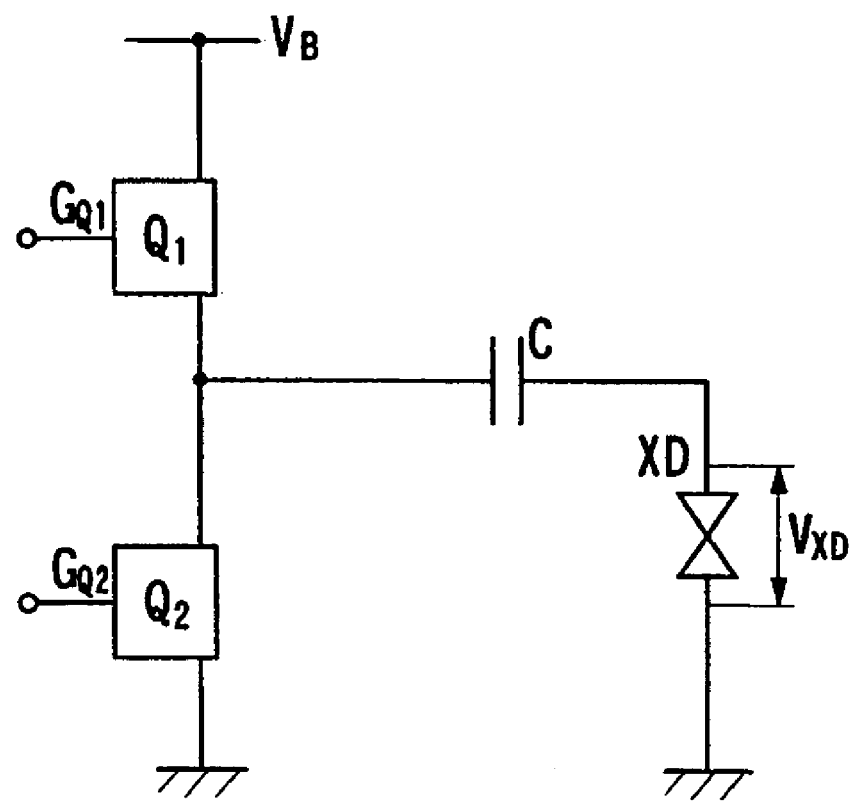
FIG. 10 is an equivalent circuit of a half-bridge circuit.
Figure 11A:
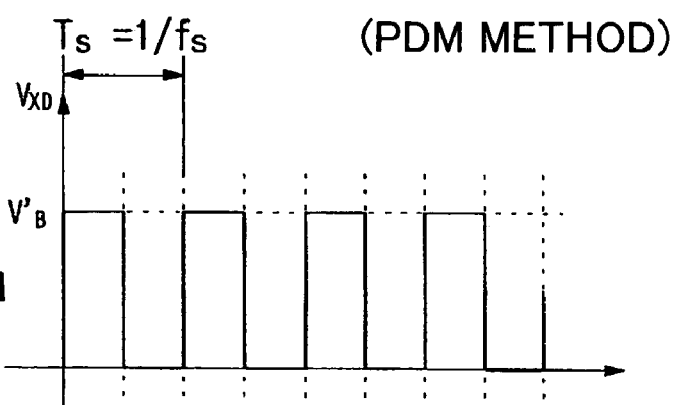
FIGS. 11A, 11B AND 11C are diagrams showing a driving pulse signal generated by the halt-bridge circuit of FIG. 10 and control signals (drive signals) supplied to individual switching devices of the half-bridge circuit.
Figure 11B:
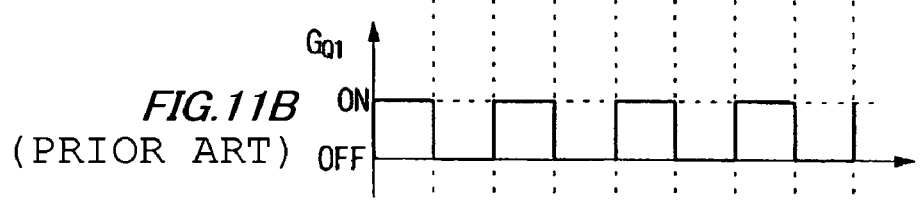
Figure 11C:
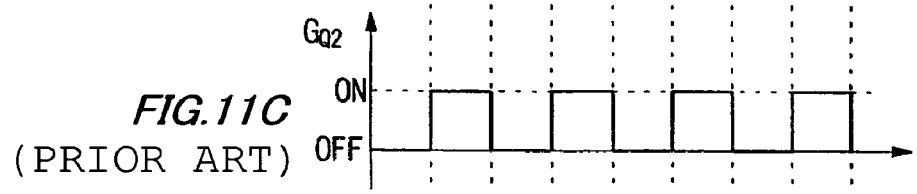

FIGS. 7A-7C are diagrams showing the waveform of a driving pulse signal, a frequency spectrum of the driving pulse signal and a frequency spectrum of a driving signal obtained when the amplitude of the driving signal is decreased (to produce reduced output power) in the aforementioned circuit configuration in which the driving pulse signal is generated by switching the FETs 51, 52 at the frequency fa higher than the frequency fs of the driving signal by using the clock signal as a reference. FIGS. 7A-7C shows a case in which the switching frequency fa is 813 kHz and the frequency fs of the driving signal is 81 kHz, FIG. 7A depicting the waveform of the driving pulse signal of which level is decreased by an amount corresponding to one-half the driving voltage $V_B$.

Since a plurality of pulses having the period Ta (<Ts) are output during the period Ts of the driving signal when the output power is reduced, the ultrasonic signal radiated from the vibrating element 10 contains a greater amount of frequency components related to these pulses. The amount of harmonic components related to the frequency fs of the driving signal decrease, however. In particular, the second harmonic component is not produced at all.

Thus, the frequency spectrum of the driving pulse signal scarcely contains the switching frequency (fundamental frequency) fa and harmonic components thereof that are integral multiples of the fundamental frequency. Accordingly, it is possible to suppress the harmonic components of the frequency fs of the driving signal by blocking these frequency components by use of a low-pass filter. In addition, the switching frequency fa is so much separated from the frequency fs of the driving signal that a low-pass filter having characteristics suited for removing harmonic components related to the switching frequency fa can be easily configured.

Figure 13A:
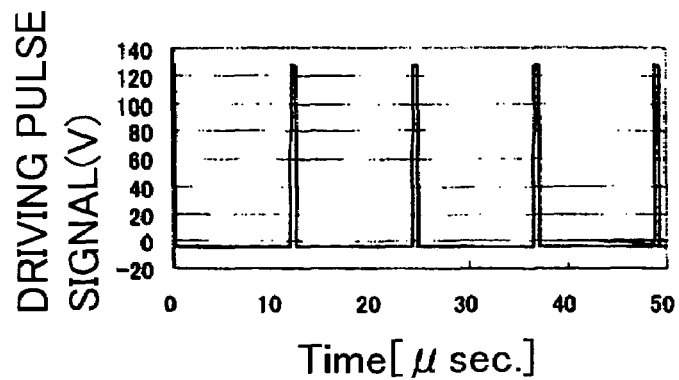
FIGS. 13A, 13B and 13C are diagrams showing the waveform of a driving pulse signal obtained when an ultrasonic signal is produced at output power reduced to a specific level (−20 dB) by using the half-bridge circuit, a frequency spectrum of the driving pulse signal observed at the same time, and a frequency spectrum of the ultrasonic signal, respectively.
Figure 13B:
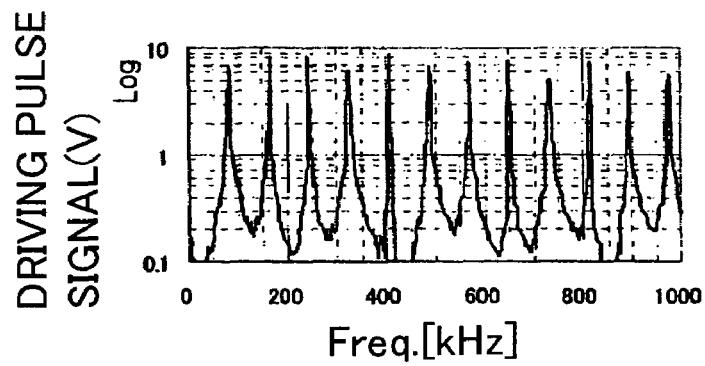
Figure 13C:
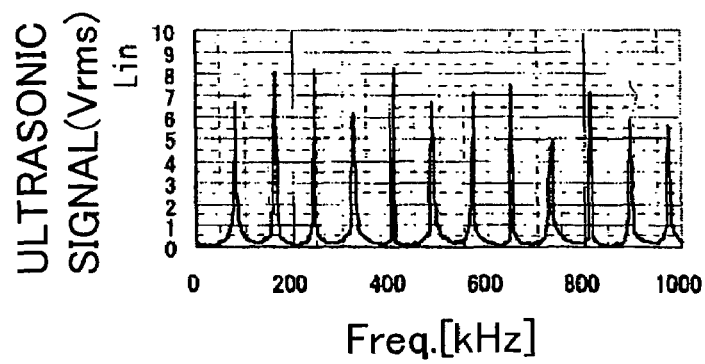

Since the drive signals 1H, 1L switched by the PWM control method are used when the output power is reduced, it is possible to suppress the occurrence of harmonics depicted in FIGS. 13A-13C. This makes it easier to output the driving signal of which amplitude is decreased to a specific level. Also, it is made possible to prevent an increase in power loss as a result of switching operation at the reduced output power.

The embodiment employing the aforementioned circuit configuration makes it possible to substantially use the PDM control method in which the switching devices (FETs 51, 52) of the half-bridge circuit are switched at the frequency fs of the driving signal when the output power (amplitude) of the driving signal is at a maximum. Further, when the output power (amplitude) of the driving signal is reduced, it is possible to use the PWM control method in which the switching devices (FETs 51, 52) of the half-bridge circuit are switched at a switching frequency higher than the frequency fs of the driving signal. Therefore, it is possible to output the driving signal at high efficiency at the maximum output power and output the driving signal while suppressing the occurrence of harmonics at the reduced output power.

Consequently, the circuit configuration of the embodiment makes it possible to easily output high-efficiency driving signals having different amplitudes, from which unwanted components have been removed, to the individual vibrating elements 10 and to assign varying weights to the individual vibrating elements 10 at high efficiency with ease and high accuracy. Furthermore, the embodiment makes it possible to reduce the number of components used in ultrasonic equipment, contributing thereby to a reduction in equipment size and in manufacturing cost.

Since the amplitude of the driving signal supplied to each vibrating element 10 can be easily controlled as discussed above, it is possible to give desired weights to the individual vibrating elements 10 and properly control directivity of the transmitting beam formed by all the vibrating elements 10 arranged on the transducer.

As strong directivity can be given to the transmitting beam emitted from the transducer, it is possible to suppress side lobes. This makes it possible to obtain a single echo, and not multiple echoes, from a single target and eventually a desirable sounding result.

While the invention has thus far been described with reference to the specific embodiment thereof in which the driving pulse signal is generated by the PWM control method by using the clock signal as a reference and the driving pulse signal having substantially the same waveform as obtained by the PDM control method is produced at the maximum output power, the invention is not limited to this embodiment. For example, the driving pulse signal may be generated by using the PDM control method at the maximum output power and by using the PWM control method at the reduced output power.

In addition, while the foregoing discussion has dealt with a case where the ultrasonic signal transmitted from the transducer has a single frequency, the invention is applicable to a scanning sonar and other ultrasonic equipment operating on multiple frequencies as well.

What is claimed is:

1. An ultrasonic transmitter comprising:
   a transducer on which a plurality of vibrating elements are arranged; and
   a transmitting beamformer for forming an ultrasonic transmitting beam by activating vibrating elements by feeding driving pulse signals thereinto so that the individual vibrating elements output ultrasonic signals at a specific transmitting frequency fs and at varying amplitudes, the transmitting beamformer including half-bridge circuits each of which includes a pair of series-connected switching devices and generates the driving pulse signal by alternately switching the two switching devices at a specific switching frequency fa;
   wherein each of the half-bridge circuits generates the driving pulse signal by matching the switching frequency fa to the transmitting frequency fs and matching the sum of ON periods of the switching devices to the sum of OFF periods of the switching devices within each switching cycle of the switching devices when the ultrasonic signals are transmitted at maximum output power; and
   each of the half-bridge circuits generates the driving pulse signal based on multiple patterns of ON periods and OFF periods of the switching devices contained in each switching cycle of the switching devices by making the switching frequency fa higher than the transmitting frequency fs and controlling an ON/OFF pattern determined by a combination of the ON periods and the OFF periods of the switching devices when the ultrasonic signals are transmitted at reduced output power.

2. The ultrasonic transmitter according to claim 1, wherein the switching frequency fa is controlled based on a reference signal having a frequency ff higher than the switching frequency fa regardless of the output power of the ultrasonic signals.

3. An ultrasonic transceiver comprising:
   the ultrasonic transmitter according to claim 1; and
   a receiving beamformer for producing an ultrasonic receiving beam by controlling signals produced from ultrasonic waves received by a plurality of vibrating elements of the transducer.

4. A sounding apparatus comprising:
   the ultrasonic transceiver according to claim 3; and
   a device for controlling the receiving beamformer to scan successive azimuthal directions within the transmitting beam and pick up echo signals from the individual sounding directions and for displaying signals obtained from the echo signals.

5. An ultrasonic transmitter comprising: a vibrating element driven by a driving pulse signal for outputting an ultrasonic signal at a transmitting frequency fs; and
   a half-bridge circuit which comprises a pair of series-connected switching devices and generates the driving pulse signal by alternately switching the two switching devices at a specific switching frequency fa, with the driving pulse signal supplied to the vibrating element;
   wherein the half-bridge circuit generates the driving pulse signal by matching the switching frequency fa to the transmitting frequency fs and matching the sum of ON periods of the switching devices to the sum of OFF periods of the switching devices within each switching cycle of the switching devices when the ultrasonic signal is transmitted at maximum output power; and
   the half-bridge circuit generates the driving pulse signal based on multiple patterns of ON periods and OFF periods of the switching devices contained in each switching cycle of the switching devices by making the switching frequency fa higher than the transmitting frequency fs and controlling an ON/OFF pattern determined by a combination of the ON periods and the OFF periods of the switching devices when the ultrasonic signal is transmitted at reduced output power.

6. An ultrasonic transmitter comprising:
   a vibrating element driven by a driving pulse signal for outputting an ultrasonic signal at a transmitting frequency fs; and
   a half-bridge circuit which comprises a pair of series-connected switching devices and generates the driving pulse signal by alternately switching the two switching devices at a specific switching frequency fa, with the driving pulse signal supplied to the vibrating element;
   wherein the half-bridge circuit generates the driving pulse signal by matching the switching frequency fa to the transmitting frequency fs when the ultrasonic signal is transmitted at maximum output power; and
   the half-bridge circuit generates the driving pulse signal by making the switching frequency fa higher than the transmitting frequency fs when the ultrasonic signal is transmitted at reduced output power.

7. An ultrasonic transmitter, comprising:
   at least one vibrating element for producing ultrasonic signals;
   a circuit having a pair of series connected switches; and
   means for generating drive signals that alternately switch said switches at a predetermined switching frequency to produce a pulse driving signal for driving the vibrating element;

wherein the switching frequency of said drive signals is matched to the transmitting frequency of the ultrasonic signals in order to suppress the occurrence of harmonics in the ultrasonic signals.

8. An ultrasonic transmitter according to claim 7 wherein the amplitude of the ultrasonic signals is a function of a duty ratio between the pair of drive signals.

9. An ultrasonic transmitter according to claim 8 which further includes a waveform memory and a digital signal processor to generate said drive signals.

10. An ultrasonic transmitter according to claim 7 wherein there are a plurality of vibrating elements disposed on a transducer.

11. An apparatus, comprising:
- a transducer having a plurality of vibrating elements for producing ultrasonic signals;
- a transmitting beamformer, coupled to said transducer, said transmitting beamformer including;
- a circuit having a pair of series connected switches; and
- a signal for generating drive signals that alternately switch said switches at a predetermined switching frequency to produce a pulse driving signal for driving the vibrating element;
- wherein the switching frequency of said drive signals is matched to the transmitting frequency of the ultrasonic signals in order to suppress the occurrence of harmonics in the ultrasonic signals.

12. An apparatus according to claim 11 which further includes a receiving beamformer responsive to the output of said transmitting beamformer, said receiving beamformer scanning successive directions to pick up echo signals caused by the ultrasonic signals from the transmitting beamformer.

13. A method for driving a transducer having at least one vibrating element for producing ultrasonic signals, said transducer being coupled to a beamformer including a circuit having a pair of series connected switches, which comprises the steps of;
- generating drive signals that alternately switch said switches at a predetermined switching frequency to produce a pulse driving signal for driving the vibrating element;
- matching the switching frequency of said drive signals to the transmitting frequency of the ultrasonic signals in order to suppress the occurrence of harmonics in the ultrasonic signals.

14. A method according to claim 13 which further includes controlling the amplitude of the ultrasonic signals by varying a duty ratio between the drive signals.

15. A method according to claim 13 which further includes the step of scanning successive directions to pick up echo signals caused by the ultrasonic signals from the beamformer.

* * * * *